(No Model.)
E. C. JOHNSON.
THERMOMETER CASE.
No. 538,077.  Patented Apr. 23, 1895.
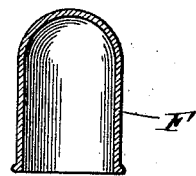
Fig. 1.    Fig. 2.    Fig. 3.
 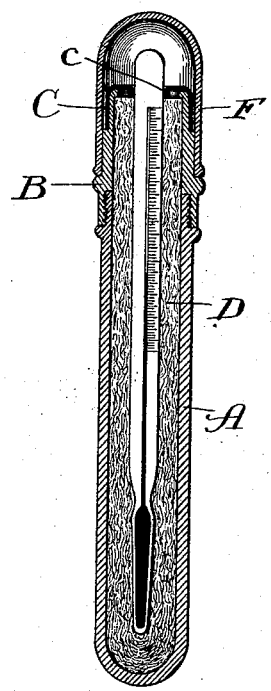 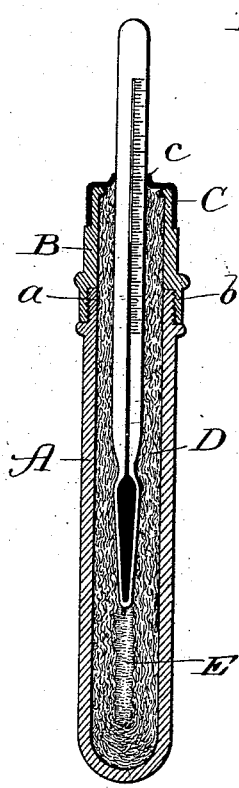
Witnesses:
Inventor:
Edward C. Johnson

UNITED STATES PATENT OFFICE.

EDWARD C. JOHNSON, OF HAMMOND, INDIANA, ASSIGNOR TO W. O. JOHNSON, OF CHICAGO, ILLINOIS.

THERMOMETER-CASE.

SPECIFICATION forming part of Letters Patent No. 538,077, dated April 23, 1895.

Application filed October 18, 1894. Serial No. 526,247. (No model.)

*To all whom it may concern:*

Be it known that I, EDWARD C. JOHNSON, a citizen of the United States, residing at Hammond, Indiana, have invented certain new and useful Improvements in Thermometer-Cases, of which the following is a specification.

My improvement or invention has more particular reference to thermometers used in medical practice, and commonly spoken of as fever thermometers; and it has for its object the providing for such thermometers of a case in which an antiseptic fluid or compound may be applied to the thermometer so as to obviate the danger resulting from its use with different persons; and my invention consists in the features and details hereinafter described and claimed.

In the drawings, Figure 1 is a side elevation of my improved thermometer case; Fig. 2, a longitudinal section of the same; and Fig. 3 the same as Fig. 2, except that the cap of the case is removed and the thermometer partially withdrawn.

In making my invention or improvement in thermometer cases, I make a case, A, of rubber, metal or other hard substance adapted for the purpose, and preferably provided at its upper end with a series of screw threads, *a*, as shown in Figs. 2 and 3. I make a top, B, provided at its lower end with screw threads, *b*, adapted to engage with the screw threads on the lower portion of the case, so that the two may be screwed together as shown in the drawings. The top, B, is provided with an annular opening at its outer end, of considerably larger diameter than the diameter of the thermometer intended to be inserted in the case. I arrange a cover, C, of rubber, leather, or other elastic material, which is adapted to encircle, embrace or cover the upper end of the top, B, and to extend across its outer end. This cover is provided with a circular hole, considerably smaller in diameter than the diameter of the thermometer intended to be inserted through it, so that when the thermometer is inserted, as shown in Fig. 2, the annular edges, *c*, of the cover will be bent or turned inward, as shown in Fig. 2, so as to tightly encircle or embrace the thermometer and form practically, if not quite, a fluid tight and air tight joint between the cover and the thermometer. I line the interior of the case with a porous or absorbent material, D, which, when the thermometer is out, expands into and almost fills the interior of the case. I then partially fill the interior of the case with an antiseptic fluid, E, which is absorbed by the lining, D, so as to keep the same constantly charged or saturated with it. When the thermometer is inserted, the antiseptic fluid is forced out into the absorbent lining, so that the surface of the thermometer is kept constantly in contact with it. When the thermometer is withdrawn for use, the edges, *c*, of the cover are bent or turned out, as shown in Fig. 3, so that as the thermometer is withdrawn, its surface will be wiped and dried and the antiseptic fluid retained within the case.

When the thermometer is not in use, the cap, F, may be applied, as shown in Fig. 2 to protect the parts.

What I regard as new, and desire to secure by Letters Patent, is—

1. In thermometer cases, the combination of an outer case, a lining of absorbent material, and a flexible cover provided with a perforation to permit the insertion of the thermometer into the case and to wipe and dry the same as it is removed, substantially as described.

2. In thermometer cases, the combination of an outer case, a lining of absorbent material, a flexible cover provided with a perforation to permit the insertion of a thermometer into the case and adapted to wipe and dry the thermometer as it is removed, and an inclosing cap fitted over the case and cover to protect the parts when not in use, substantially as described.

EDWARD C. JOHNSON.

Witnesses:
THOMAS A. BANNING,
THOMAS B. MCGREGOR.